Feb. 4, 1958 — B. C. COMER — 2,822,228
MOUNTING FOR ADJUSTABLE TABLE TOP LEGS
Filed June 11, 1956
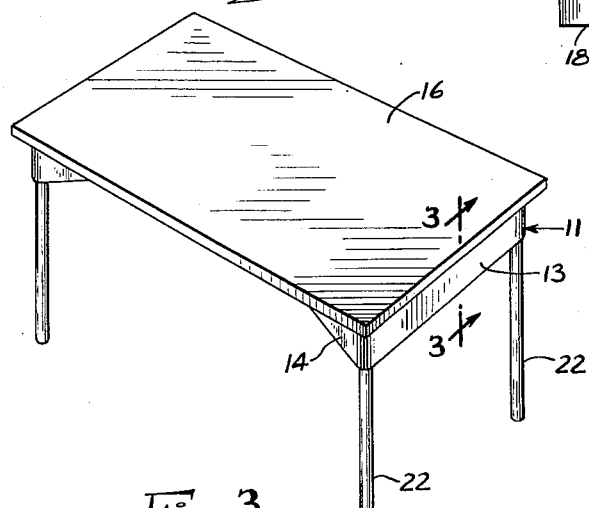
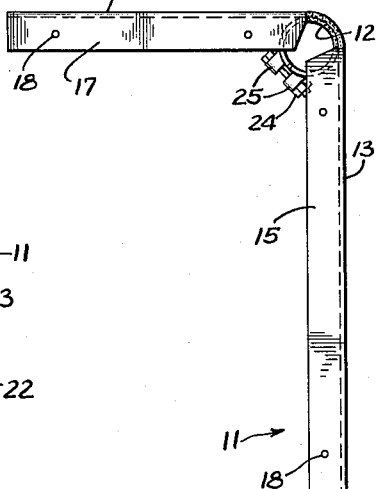
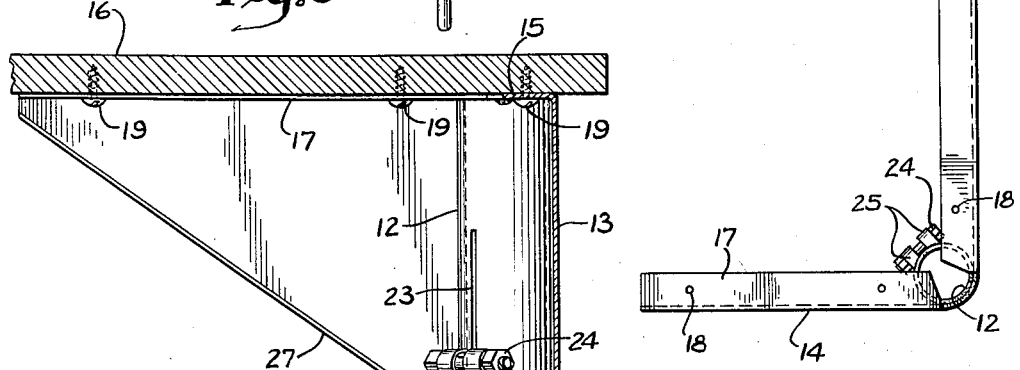
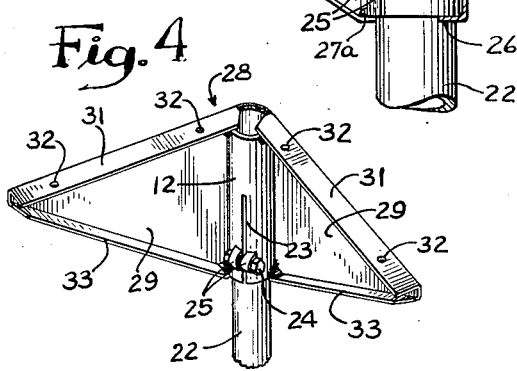
Inventor
BOYD C. COMER
by: Charles N. Lidman Atty.

United States Patent Office 2,822,228
Patented Feb. 4, 1958

2,822,228

MOUNTING FOR ADJUSTABLE TABLE TOP LEGS

Boyd C. Comer, Aurora, Ill.

Application June 11, 1956, Serial No. 590,535

5 Claims. (Cl. 311—111)

The invention relates to improvements in leg mountings and is more particularly concerned with the construction of a one-piece mounting frame for securing a pair of legs to a table top or the like and which will permit easy and quick adjustment of the effective length of the legs. It is preferred that two such frames be used, one at each end of the table top.

The table leg mounting frame of the present invention is characterized, in one of the disclosed embodiments, by being fabricated from a single strip of stiff sheet metal suitably shaped to provide an elongated intermediate body portion and a pair of wing portions extending perpendicular to one face and one at each end of the intermediate portion. Tubular leg socket members are integrally secured to the formed strip, one at the juncture of the intermediate portion with each wing portion and these tubular sockets are preferably split, at least in part, so as to be circumferentially adjustable to permit adjustment of the effective length of legs mounted therein. The structure is such as to greatly reduce the cost of table manufacture and to simplify its assembly and it is one of the objects of the invention to accomplish this.

In another of the herein disclosed embodiments, a separate mounting frame or bracket is provided for each leg. Each frame includes a right angularly shaped structure having a leg socket integral therewith and within which a leg can be adjusted for varying its effective length. It is therefore another object of the invention to provide such a leg mounting frame.

Another object of the invention is to provide a novelly constructed one piece leg mounting frame or bracket.

A further object of the invention is to provide a one-piece leg mounting frame with leg sockets formed integral therewith, each of which is formed to receive and secure a leg in any position of axial adjustment therein.

A still further object of the invention is to provide a novel leg mounting frame that is inexpensive to manufacture, is very rugged in construction, and is easy to assemble on a table.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size, and minor details of the structure may be made without departing from the spirit of the invention.

Referring to the drawings in which the same characters of reference are employed to identify corresponding parts:

Figure 1 is a perspective view of a table embodying features of the present invention;

Figure 2 is a top plan view of one of the leg mounting frames shown on the table illustrated in Figure 1;

Figure 3 is an enlarged sectional detail view taken on line 3—3 of Figure 1; and, Figure 4 is a perspective view of a leg mounting frame embodying modified structural features.

Referring to the accompanying drawing and particularly to the embodiment of the invention shown in Figures 1 to 3, inclusive, the leg mounting frame comprises a U-shaped sheet metal structure, generally illustrated at 11, having a pair of leg sockets 12 integral therewith. The sheet metal frame structure 11 may be fabricated in any suitable fashion but it includes an elongated intermediate body portion 13 and a pair of side wings or end portions 14. The side wings are integral extensions of the material forming the intermediate portion and they extend perpendicular thereto in a common direction to provide the U-shaped configuration illustrated.

When in use, the frame 11 is disposed with the plane of its intermediate portion 13 in a vertical position and the upper margin thereof is bent inwardly perpendicular to its plane to provide a flange 15 that is seated firmly against the bottom face of a table top 16 or the like. The top margin of each of the side wings is similarly bent perpendicular to its plane so as to define inturned top flanges 17 which also seat against the bottom face of the table top 16. At least the flanges 17 are provided with holes 18 to receive anchor screws 19 for securing the frame 11 to the underside of the table top, although it should be obvious that similar holes can be provided in the flange 15 should their presence be desired or required.

The portions of the sheet metal frame 11 at the juncture of the intermediate portion 13 with each wing portion 14 are curved gracefully preferably on a radius corresponding substantially to the radius of the vertically arranged tubular leg sockets 12 which are fitted inside the frame one at each juncture. Each socket is welded, brazed or otherwise secured to the frame 11 and, as shown, it is preferably of a length corresponding substantially to the vertical width of the frame 11 so that its upper end may abut the underside of the flanges 15 and 17. Each socket is adapted to telescopically receive the upper end portion of a tubular leg 22.

In order to permit easy insertion and removal of the legs and to facilitate their vertical adjustment, each socket 12 is slotted inwardly of one end, as at 23, for at least a part of its length. The overall circumference of the socket in the area of the slot can be varied by manipulation of a clamp screw or bolt 24 engaged in lugs 25 formed integral with the socket, one on each side of the slot. In this manner, the sockets can be loosened to permit insertion or removal of the legs, or they can be contracted to secure the legs in any position of vertical adjustment therein.

In order to insure utmost rigidity to the frame 11, the intermediate body portion 13 is formed with a lower inturned flange 26 and the side wing portions preferably are triangular shaped and each is formed on its inclined lower edge with an inturned reinforcing flange 27. The ends of the flange 26 and the lower end of flange 27 may abut the sockets and if desired may be welded or brazed thereto as shown at 27a. Because the frame 11 may be constructed from sheet metal, it may be produced inexpensively and the nominal time consumed and low costs incurred in welding, or otherwise securing the tubular leg sockets in place, keeps the assembly costs at a minimum, thus providing a low cost preassembled unit having maximum rigidity.

The embodiment disclosed in Figure 4 comprises a sheet metal corner frame 28 comprising a pair of vertically disposed triangular shaped wings 29 bent perpendicular to each other and having a tubular leg socket 12 secured thereto at their juncture, by brazing, welding, or otherwise. Each wing has an upper marginal flange 31, apertured at 32 to receive a securing screw for attaching the frame 28 to the underside of a table top. The lower edge of each triangular wing 29 is flanged, as at 33, to provide maximum rigidity to the frame. In use, four such leg brackets 28 are secured to the underside of a table top, one adjacent to each corner thereof. The effective length of the legs 22 may be varied by adjusting them vertically in their sockets 12, which correspond in all respects to the sockets 12 described in detail hereinabove.

Although exemplary embodiments of the invention have been shown and described it should be understood that the invention is capable of being embodied in a variety of modified structures and that it is not desired to limit the invention to the exact disclosures herein but to embrace any such variations and adaptions as will fall within the scope of the appended claims.

I claim as my invention:

1. A leg mounting assembly including a frame comprising an elongated strip of sheet metal stock having end portions extending in a common direction substantially perpendicular to the intermediate portion to define end wings, said intermediate portion and said wings being disposed in vertical planes, a horizontal flange on the upper edge of each wing, a longitudinal flange on the upper edge of the intermediate portion, at least the flanges on the wings being apertured to receive mounting means for securing the frame to a surface, said wings being substantially triangular shaped and formed with reinforcing flanges on their inclined edges, tubular sockets integrally attached to said frame one at the juncture of each wing portion with the intermediate portion, said tubular sockets being longitudinally slotted inwardly of one end for at least a portion of their length, legs one telescoped into each tubular socket, and means to constrict the tubular sockets about the legs so as to retain the legs therein.

2. A leg mounting assembly of the character recited in claim 1, in which the tubular elements are arranged vertically inside the sheet metal frame and have their upper ends in abutment with the flanges on the upper edges of the intermediate and wing portions.

3. A leg mounting assembly including a frame comprising an elongated strip of sheet metal stock arranged in a vertical plane and having end portions extending in a common direction substantially perpendicular to its intermediate portion to define end wings, said wings each being substantially triangular in shape, a perpendicular flange on the upper edge of each wing, a longitudinal flange on the upper edge of the intermediate portion, at least some of said flanges having holes therein to receive means for securing the frame to a surface, reinforcing flanges on the inclined edges of the triangular shaped wings, tubular elements integrally attached to said strip one at the juncture of each wing portion with the intermediate portion, said tubular elements being slotted for at least a portion of their length, legs one telescoped into each tubular element, and means to constrict the tubular elements about the legs so as to retain the legs therein.

4. A leg mounting assembly of the character recited in claim 3, in which the tubular elements are arranged against the inside face of the sheet metal structure and have their upper ends in abutment with the flanges on the upper edges of the intermediate and wing portions.

5. A leg mounting structure comprising a one-piece sheet metal frame including an elongated vertical intermediate portion and vertical side portions integral therewith, said intermediate and side portions having perpendicular edge flanges lying in a common plane, the side portions being triangular in outline and having a reinforcing flange on their inclined edge, leg sockets integrally secured to the frame one at the juncture of each side portion with the intermediate portion, each of said sockets being tubular and having a slot in its wall extending inwardly from one end, and means carried by each leg socket for circumferentially contracting the socket.

References Cited in the file of this patent

UNITED STATES PATENTS

| 56,986 | Oppenheimer | Aug. 7, 1866 |
| 1,189,949 | Holmes | July 4, 1916 |
| 1,264,228 | Uhl | Apr. 30, 1918 |
| 1,870,173 | Calton | Aug. 2, 1932 |
| 2,194,750 | Hardy | Mar. 26, 1940 |

FOREIGN PATENTS

| 548,008 | Germany | Apr. 7, 1932 |